United States Patent [19]

Witte, deceased

[11] Patent Number: 4,786,174

[45] Date of Patent: Nov. 22, 1988

[54] POLYCHROMATOR

[75] Inventor: Wolfgang Witte, deceased, late of Überlingen, Fed. Rep. of Germany, by Inge Witte, heiress

[73] Assignee: Bodenseewerk Perkin-Elmer & Co., GmbH, Überlingen, Fed. Rep. of Germany

[21] Appl. No.: 942,559

[22] Filed: Dec. 16, 1986

[30] Foreign Application Priority Data

Dec. 17, 1985 [DE] Fed. Rep. of Germany ....... 3544512

[51] Int. Cl.$^4$ .................................................. G01J 3/18
[52] U.S. Cl. ................................................... 356/328
[58] Field of Search ............... 356/305, 328, 331, 332, 356/334

[56] References Cited

U.S. PATENT DOCUMENTS 4,060,327 11/1977 Jacobowitz et al. ................. 356/328
4,563,090 1/1986 Witte .................................... 356/328

FOREIGN PATENT DOCUMENTS 3322639 4/1981 Fed. Rep. of Germany .
3224736 1/1984 Fed. Rep. of Germany .
2940325 1/1984 Fed. Rep. of Germany .
46825 3/1984 Japan .................................... 356/334
853418 8/1981 U.S.S.R. ............................... 356/334

OTHER PUBLICATIONS

Brochure-McPherson Vacuum 3 Mode Half Meter-Monochrometer-Spectrograph-Polychromator-Model 216.5, McPherson Instrument Corporation.

Primary Examiner—F. L. Evans
Attorney, Agent, or Firm—Ronald G. Cummings; Francis L. Masselle; Edwin T. Grimes

[57] ABSTRACT

In a polychromator, the image plane or the focus line (28) is adapted optimumly to the plane of a detector (26), e.g. to a diode-array. At the same time, an optimum linear wavelength scale is obtained on the detector (26). To this end, an arrangement having a concave grating (14), and an imaging mirror (20) is provided. An optimizing method is described by which both curves can be optimized in converging steps by alternate variation of the distance b between concave grating (14) and mirror (20) and the asymmetry measure G' of the concave grating (14).

21 Claims, 1 Drawing Sheet

POLYCHROMATOR

BACKGROUND AND SUMMARY OF THE INVENTION

This invention relates to polychromators and more particularly to a polychromator apparatus and technique for adapting the image plane to the detector plane and for attaining optimal linearity of the wavelength scale in the plane of the detector.

In a polychromator, a spectrum is generated in the plane of a detector by a dispersing element, e.g. a grating. The spectrum is formed by the images of an inlet slit generated by different wavelengths. The detector is a "locally resolving detector" which simultaneously detects the radiation at different points in the plane of the spectrum. Such a locally resolving detector may be a photographic plate which is blackened in accordance with the light intensity of the different spectral lines. Such a detector may also be a diode array that is a sequence of photodiodes closely arranged side by side. In the photodiode detector, the different components of the spectrum are simultaneously imaged on different photodiodes such that the different wavelengths of the spectrum are parallelly detected.

In such a polychromator, the detector plane is generally flat. Therefore, the image plane composed of the monochromatic images of the inlet slit should be as flat as possible. This is particularly true for the tangential section while the sagital section is less critical because the width of the slit determining the resolution becomes effective in the tangential section. Furthermore, it is desirable to obtain a wavelength scale as linear as possible on the detector so that the distance of a monochromatic slit image measured transversely to the direction of the slit is linearly dependent on the wavelength.

In known polychromators having a concave grating, the concave grating forms the only optical element which images the inlet slit on the plane of the detector. The concave grating also thereby simultaneously provides for the spectral splitting up of the images of the inlet slit. Thus, the concave grating simultaneously provides two functions: It provides an image of the inlet slit and it serves as a dispersing element.

Furthermore, it is known to optimize such polychromators in the tangential section with regard to the image plane such that the image plane coincides as well as possible with the plane of the detector. The optimization therein is made such that the slit image lies exactly in the plane of the detector with three wavelengths within the utilized spectral range. The remaining defocussing is minimum at the other wavelengths. However, with such an optimization of the image plane, a nonlinear arrangement of the slit images associated with the different wavelengths results. The distance of the different monochromatic slit images from a reference mark measured transversely to the direction of the slit depends nonlinearly on the wavelength. It can be attempted to optimize the linearity of the wavelength scale in a similar manner, but then the optimal adaptation of the image plane to the plane of the detector is not achieved.

Accordingly, it is an object of the present invention to provide a new and improved polychromator.

Another object of the invention to provide a polychromator which simultaneously achieves adaptation of the image plane to the plane of the detector in the tangential section and optimal linearity of the wavelength scale on the plane of the detector.

Another object of the invention is to provide a technique for optimizing the image plane characteristics and wavelength scale characteristic of a polychromator.

Other objects will be in part obvious and in part pointed out more in detail hereinafter.

It has been found that the foregoing and related objects and advantages are attained in a polychromator having an inlet slit for introducing a beam of light from a light source, a concave grating for spectrally dispersing light from the inlet slit into a wavelength spectrum, and a locally resolving detector for simultaneously detecting radiation at different points in a plane. An imaging mirror is disposed along the path of rays for deflecting the spectrally dispersed light from the grating so as to image a wavelength spectrum of slit images on the detector. In a preferred embodiment of the invention, the path of rays in tangent section extends substantially z-shaped from the inlet slit to the detector. The concave grating is angularly oriented relative to the mirror by reference to the white light position of the grating relative to the mirror. Preferably, the axis is normal to the plane of the grating is oriented toward the mirror relative to the white light position of the normal axis. With this configuration, the image plane of the slit images formed by the mirror is adapted to the flat detection plane of the detector at the wavelengths of the spectrum and the wavelength scale along the detection plane has optimal linearity.

Thus, it has been found that optimization of the image plane and optimization of the wavelength scale can be achieved at the same time by using an additional imaging mirror in the special configuration of the present invention.

In the method of the present invention, the image plane of the mirror is optimumly adapted to the plane of the detector while simultaneously attaining an optimum linear wavelength scale on the detector by alternate variation of the distance between the concave grating and the mirror and the asymmetry measure G' of the concave grating in converging steps.

DESCRIPTION OF THE PREFERRED EMBODIMENT

Figure 1:
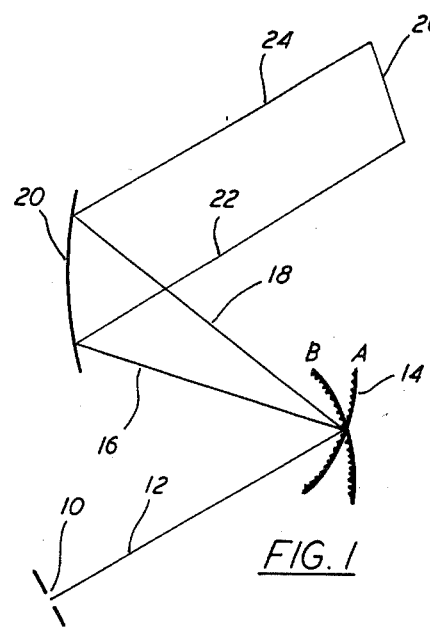
FIG. 1 is a diagrammatic view showing a tangential section through a polychromator having a concave grating and an additional imaging mirror with two possible arrangements of the concave grating being shown for describing the invention and the path of rays extending substantially z-shaped.

Although specific forms of the present invention have been selected for illustration in the drawings, and the following description is drawn in specific terms for the purpose of describing these forms of the invention, the description is not intended to limit the scope of the invention which is defined in the appended claims.

Referring to the drawings wherein the same numerals are utilized to identify like or similar parts in the several figures, the numeral 10 in FIG. 1 designates an inlet slit from which a polychromatic light beam 12 emerges. Only the beam axis of the light beam 12 is shown as with all other light beams in the figures. The light beam 12 impinges upon the concave grating 14. The concave grating splits up the radiation depending on the wavelength. The two beams 16 and 18 form the two boundary wavelengths of the spectral region used. An imaging mirror 20 deflects the beam 16 into a beam 22 and the beam 18 into a beam 24. The beams 22 and 24 impinge upon a detector 26.

In the illustrated embodiment, the imaging mirror 20 is a concave mirror and the detector 26 is a diode array. The two reflected beams 22 and 24 impinge upon the detector 26 at the two ends thereof. The beams of other wavelengths of the utilized spectral region extend between the drawn boundary beams 22, 24 and impinge upon the detector 26 between said two ends.

The two beams 22 and 24 need not necessarily extend parallel to each other. The detector 26 also does not necessarily need to be perpendicular to one of the two beams or a beam therebetween.

The path of rays in FIG. 1 extends "z-shaped" which means that the impinging, polychromatic beam 12 does not cross the emerging beams 16 and 18, respectively. In the illustrated embodiment, the arrangement is such that the beam 12 forms an acute angle with the beams 16 and 18, respectively, and the beams 16 and 18 in turn are again diverted by the mirror 20 approximately in the direction of the beam 12 such that the beam 12 does not cross the beams 22 and 24.

The angles between beam 12 and the beams 16 and 18, respectively, can also be between 90° and 180° if required. The direction of the emerging beams 22 and 24 can deviate greatly from the direction of the impinging beam. It is necessary that the beams 22, 24 be diverted by the mirror 20 to the far side of beams 16, 18 remote from the impinging beam 12 and not to the near side of beams 16, 18 toward the impinging beam 12.

Considering one of the dispersed beams, for example beam 18, there is one position of the grating in which the beam 18 corresponds with the white light position that is the direction in which the grating reflects light of the impinging beam 12 in zero order. The grating 14 has to be rotated out of this position in order to get the desired spectral region into the region between beams 16 and 18. Two possible positions of the grating 14 are illustrated in FIG. 1 and designated by A and B. In position A, the normal to the plane of the grating has been tilted clockwise (as viewed in FIG. 1) towards the mirror 20 relative to the position in which the beam 18 is directed in the white light position. In position B, the normal to the plane of the grating has been rotated counter-clockwise (as viewed in FIG. 1) towards the inlet slit 10. Accordingly, in position A, the wavelength scale extends from the top to the bottom on the detector 26 with the short wavelength end of the utilized spectral region being represented by the beam 24 which is remote from the grating and the long wavelength end of the spectral region being represented by the beam 22 which is nearer to the grating. In position B of the concave grating 14, the wavelength scale extends on the detector in the opposite direction from position A with the beam 22 corresponding to the short wavelength end and the beam 24 corresponding to the long wavelength end of the utilized spectral region.

Figure 2:
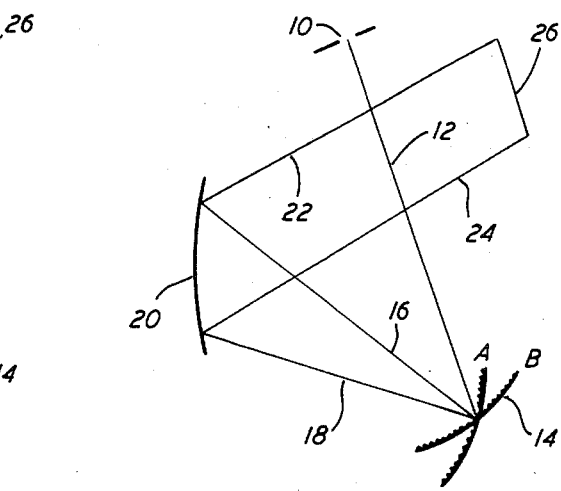
FIG. 2 is a diagrammatical view similar to FIG. 1 showing a tangential section of a polychromator in an arrangement in which the light beam impinging from the inlet slit upon the concave grating crosses the dispersed light beams being directed from the mirror to the detector, the concave grating also being illustrated in two possible positions.

FIG. 2 illustrates another conceivable arrangement wherein the inlet slit 10 and the grating 14 are disposed such that the polychromatic beam 12 crosses the dispersed beams 22 and 24 reflected by the mirror 20 upon the detector 26. Two possible positions A and B of the grating 14 are illustrated which correspond to the positions A and B of FIG. 1.

Therefore, there are all in all four possible arrangements when using an additional imaging mirror 20 in a polychromator having a concave grating 14, namely the positions A and B of the grating in the z-shaped path of rays of FIG. 1 and the positions A and B of the grating 14 in the arrangement of FIG. 2. Now investigations have shown that from these four possible arrangements, only the z-shaped path of rays in connection with the position A of the grating allows simultaneous optimization of the image plane as well as the wavelength scale. The separate inventive aspects of the present invention comprise not only the utilization of an additional imaging mirror but also the realization that one and only one of the arrangements then possible allows the desired simultaneous optimization of the image plane and the wavelength scale.

Figure 3:
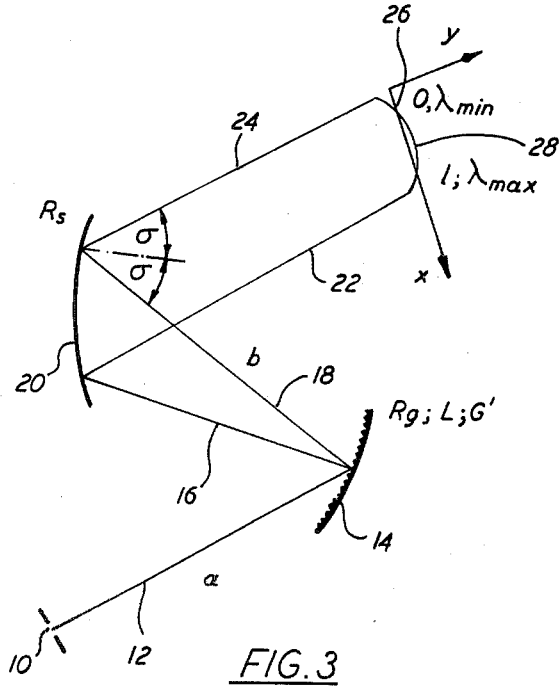
FIG. 3 is a diagrammatical view showing a tangential section through a polychromator which permits optimization of the image plane and the wavelength scale on the detector.

Referring to the embodiment of the present invention shown in FIG. 3, a polychromatic light beam 12 impinges from an inlet slit 10 upon a concave grating 14. The distance between inlet slit 12 and concave gating 14 is designated by a. The concave grating 14 has a radius of curvature $R_g$. The grating 14 shows in the center a certain line density designated by L. At other locations of the plane of the grating, the line density in tangential section is generally different from the line density in the center of the concave grating 14. The line density is varying from one border of the grating to the other border of the grating in tangential section. The line density increases in the one direction and decreases in the other direction in the direct neighborhood of the center of the grating. The lines are distributed asymmetrically on the grating and this asymmetry can be characterized by an asymmetry measure designated by $G'$. The sign plus or minus indicates the direction of increase of the line density.

The grating directs monochromatic light beams at different angles onto the mirror 20. The light beams 16 and 18 correspond to the borders of the wavelength region utilized. The distance between concave grating 14 and mirror 20 is designated by b. The concave grating 14 in FIG. 3 is pivoted with its normal to the plane into the direction towards the mirror, that is clockwise, relative to the position in which the light is reflected in zero order into the direction of the beam 18 as described in connection with position A of the concave grating of FIG. 1. Mirror 20 has a radius of curvature $R_s$ and directs the beams 16 and 18 as beams 22 and 24 on the detector 26.

As illustrated in FIG. 3 in an exaggerated way, an image plane results, that is a plane in which sharply defined monochromatic images of the inlet slit 10 are generated, which generally deviates from the plane of the detector 26 and is designated by the numeral 28. A coordinate system x,y is indicated wherein x is a distance starting from the origin 0 of the coordinates measured in the longitudinal direction of the detector 26 transverse to the direction of the slit. The origin 0 of the coordinates corresponds with the short wavelength end $\lambda_{min}$ of the utilized wavelength region while the point 1 of the utilized length of the detector corresponds with the long wavelength end $\lambda_{max}$ of the utilized wavelength region. The image plane 28 appears in the tangential section of FIG. 3 as a line which will be designated hereinafter as "focus line".

When calculating this focus line for parameters at first arbitrarily assumed, generally a curved line will result as illustrated in FIG. 3 in an exaggerated way. The detector 26 and thereby the detector-fixed x,y-system are placed on the focus line such that the detector adapts optimumly to the focus line. The focus line is in some regions in front of the detector 26. In some regions the focus line 28 is behind the detector. Thereby the detector is arranged such that for example the largest positive or negative deviation becomes minimum.

The arrangement of FIG. 3 is quantitatively described by a multitude of parameters. The angle of incidence $\phi$ of the light beam 12 at the grating 14 and the line density L (the reciprocal value of the grating constant, respectively) determine the diffraction angle of the two beams 16 and 18 and thereby the geometry of the angles at the concave grating 14. The radius of curvature $R_g$ of the concave grating and the object distance a of the inlet slit 10 influence the convergence or divergence of the monochromatic beams behind the concave grating. The position of the mirror 20 is determined by the distance b on a monochromatic beam, e.g., beam 18, between the concave grating 14 and the mirror 20. The angular orientation of the mirror 20 is given by the angle of incidence $\sigma$ (FIG. 3) of the beam 18. The radius of curvature $R_s$ of the mirror determines the image distance in which the focus line 28 appears. Finally, the asymmetry of the concave grating 14 explained above has to be taken into consideration. The result in the x,y-coordinate system may produce curve 30 in FIG. 4.

Figure 4:
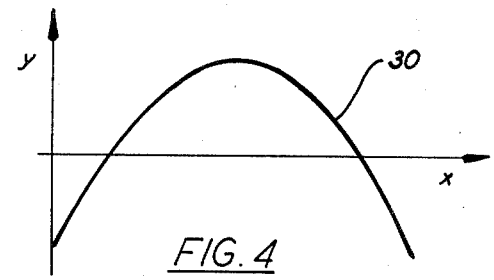
FIGS. 4 to 6 are graphic views showing different possibilities of the shape of the image plane in the region of the detector.
Figure 5:
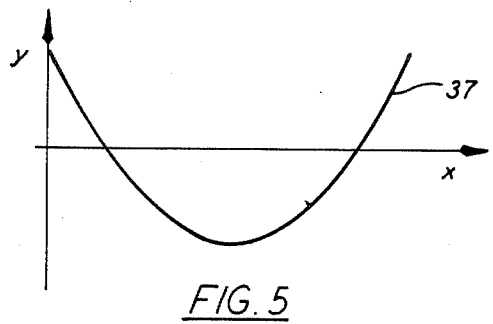

Increasing only the distance b produces a focus line as illustrated by curve 32 in FIG. 5. The curve being convex upwardly before (FIG. 4) is now convex downwardly (FIG. 5).

Figure 6:
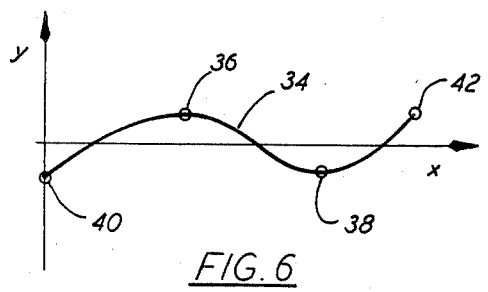

Again starting from the arrangement which formed the basis of FIG. 4 and now increasing b in smaller steps, the curve is getting flatter. The same happens starting from the arrangement which forms the basis of FIG. 5 and decreasing b in smaller steps. The transition of the curve from the one facing upwardly to the curve facing downwardly takes place in the form of an s-shaped curve. At a particular value of b, an s-shape of the curve symmetric with respect to the ordinate y is obtained as illustrated in FIG. 6 as curve 34. "Symmetric" means that the maximum deviation of the plane of the detector 26 (x-axis) has upwardly and downwardly the same amount in the points 36 and 38, respectively. This curve has minimum values of deviation between image plane and plane of the detector and therefore constitutes an optimum.

Now examining only the linearity of the wavelength scale on the detector 26, that is the dependency of the wavelength of the monochromatic light beams impinging upon the different locations of the detector 26 on the associated absciss x, generally a nonlinear function will result. A desired linear scale can be determined on the detector now. The point $x=0$ is associated with the end of the short wavelength and the value $x=1$ is associated with the end of the long wavelength in the utilized wavelength region. As associated desired wavelength results for each point x of the detector. Calculating for any point x on the detector the wavelength of the radiation actually impinging there, the deviation $$\Delta\lambda = \lambda - \lambda\text{soll}$$

can be defined as linearity error. $\Delta\lambda$ can be graphically illustrated as function of the desired wavelength (or the absciss x). Again, in general, a curve of the kind of FIG. 4 will result.

The asymmetry measure G' of the concave grating is varied now. A curve of the shape of curve 32 in FIG. 5 is obtained with another value of G'. With a particular value of G', the curve will assume a symmetrical s-shape. The deviation of linearity $\Delta\lambda$ becomes minimum.

Unfortunately, the asymmetry measure G' influences the focus line. Now calculating this again with the value of the asymmetry measure G' found to be optimum, the s-shape of the focus line is disturbed. Again, b has to be varied and an optimum value has to be found. But this again influences the $\Delta\lambda$-curve such that the asymmetry measure G' has to be corrected once again.

Fortunately the method converges. The distance b has more influence on the focus line as on the $\Delta\lambda$-curve and the asymmetry measure G' has more influence on the $\Delta\lambda$-curve as on the focus line. Thereby, eventually a pair of values of the distance b and the asymmetry measure G' will result which satisfactorily exactly provide a symmetric s-shape of both curves. Focus line and wavelength linearity are optimum.

Of course, there are a lot of other possibilities to select the other parameters. These parameters have a variety of influences on the arrangement of the polychromator, e.g. its magnitude, on the illumination of the mirror, on the wavelength region utilized, on the imaging ratio with which the inlet slit 10 is imaged on the detector 26, on the required width of the slit for the desired resolution etc. The person skilled in the art is in the position to modify the polychromator with the help of these parameters as desired. After selecting these parameters only the described optimization has to be carried out. If necessary, one of more of the parameters have to be changed and the optimization has to be carried out again until the whole polychromator corresponds to the desired specification because the complete path of rays of the polychromator, e.g. the distance of the detector 26 from the mirror 20, is only known after the optimization.

The invention is not limited to the generation of the symmetric s-shape of the focus line and the $\Delta\lambda$-curve. From time to time, for example, it can be desirable to deviate from this optimum shape in the focus line or in the $\Delta\lambda$-curve or in both.

For example, a very high resolution may be demanded in the region of the short wavelength compared with only a moderate resolution being required in the region of the long wavelength. This can be achieved if the focus line 28 is positioned on the detector 26 as accurately as possible in the region of short wavelength while it is allowed to deviate more from the detector 26 in the region of long wavelength. In this way, better results are obtained in the region of short wavelength than with optimization for the whole wavelength region. The same can apply to wavelength linearity. It can be managed by the described method to design the polychromator optimumly in accordance with the respective requirements.

The described arrangement also allows the adaption of the focus line and the wavelength scale optimumly to a curved plane of the detector.

As will be apparent to persons skilled in the art, various modifications and adaptations of the structure above-described will become readily apparent without departure from the spirit and scope of the invention, the scope of which is defined in the appended claims.

I claim:
1. A polychromator comprising,
   an inlet slit for introducing a beam of light from a light source,
   a concave grating for spectrally dispersing light from said inlet slit into a wavelength spectrum,
   a locally resolving detector means for simultaneously detecting radiation at different points in a plane, said detector means defining a detection plane, and
   imaging mirror means for deflecting spectrally dispersed light from said grating to image a wavelength spectrum of slit images on said detector means,
   said grating and said mirror means being disposed to define a predetermined path of rays between said inlet slit and said detector means for imaging a wavelength spectrum of slit images on said detector means with said grating being disposed along said path between said inlet slit and said mirror means and said mirror means being disposed along said path between said grating and said detector means, and
   said grating and said mirror means being configured and relatively positioned so that the image plane of the slit images formed by said mirror means is substantially adapted to said detection plane at the wavelengths of said spectrum and the slit images are substantially linearly disposed along said detection plane relative to wavelength.
2. The device of claim 1 wherein said predetermined path of rays in tangent section extends substantially z-shaped from said inlet slit to said detector means.
3. The device of claim 2 wherein
   said concave grating has a white light position relative to said mirror means and an axis normal to the plane of said grating, said grating being angularly positioned relative to said mirror means such that said normal axis is oriented toward said mirror relative to the white light position of the normal axis.
4. The device of claim 3 wherein said image plane is a flat s-shape being symmetrical in the direction perpendicular to said detector plane and located exactly in said detector plane at three locations.
5. The device of claim 4 wherein the wavelength of radiation impinging upon the detector plane at said three locations corresponds to the desired wavelength resulting from an exact linear wavelength scale along said detector plane and
   the deviation of the wavelengths of radiation impinging upon the detector plane at different locations from the wavelengths which result from said wavelength scale for the respective locations results in a flat s-profile symmetric in the direction of the ordinate.
6. The device of claim 1 wherein
   said predetermined path has a first path section between said inlet slit and said concave grating, a second path section between said concave grating and said mirror means and a third path section between said mirror means and said detector means and
   said grating and said mirror means are relatively disposed so that said first path section is in noncrossing relationship to said second and third path sections in tangent section.
7. The device of claim 6 wherein the angle between said first path section and said second path section is within the range of 90° to 180°.
8. The device of claim 6 wherein said predetermined path of rays in tangent section extends substantially z-shaped from said inlet slit to said detector means.
9. The device of claim 6 wherein
   said concave grating has a white light position relative to said mirror means and an axis normal to the plane of said grating, said grating being angularly positioned relative to said mirror means such that said normal axis is oriented toward said mirror relative to the white light position of the normal axis.
10. The device of claim 9 wherein
    said detector means has a detection plane and said grating and said mirror means are configured and positioned so that the image plane of the slit images formed by said mirror means is adapted to said detection plane at the wavelengths of said spectrum and the slit images are linearly dispersed along said detection plane relative to wavelength.
11. The device of claim 1 wherein said mirror means is a concave mirror.
12. The device of claim 1 wherein said detector means is a photodiode detector array.
13. The device of claim 1 wherein said concave grating is stationary.
14. A method of optimizing the imaging of a wavelength spectrum on a detector plane in a polychromator of the type having a concave grating with an asymmetry line measure G' spectrally dispersing light from an inlet slit and a locally resolving detector defining a detection plane, comprising the steps of:
    reflecting dispersed light from the grating with an imaging mirror to image a wavelength spectrum on the detection plane with the wavelength spectrum defining a wavelength scale along the detection plane,
    varying the distance between the imaging mirror and the concave grating to a first distance which minimizes the deviation of the image plane formed by the imaging mirror from the detector plane, and
    varying the asymmetry line measure G' of the concave grating to a first G' value which minimizes the deviation of the wavelength scale on the detection plane.
15. The method of claim 14 which comprises repeatedly and successively (a) varying the distance between the imaging mirror and the concave grating to minimize the deviation of the image plane from the detector plane and (b) varying the asymmetry line measure G' of the concave grating to minimize the deviation of the wavelength scale on the detector plane until the simultaneous occurrence of an optimal adaptation of the image plane to the detector plane and an optimal linear wavelength scale on the detector plane.

16. The method of claim 14 wherein varying the distance between the imaging mirror and the concave grating comprises varying said distance until the image plane in tangent section assumes an s-shape symmetric to the detector plane.

17. A polychromator comprising an inlet slit for introducing a beam of light from a light source, a concave grating for spectrally dispersing a light beam from said inlet slit into a wavelength spectrum, a locally resolving detector means for simultaneously detecting radiation at different points in a plane, said detector means defining a detection plane, and imaging mirror means for deflecting spectrally dispersed light from said grating to image a wavelength spectrum of slit images on said detector means, said grating and said mirror means being disposed to define a substantially Z-shaped path of rays in tangential section from the inlet slit to the detector means with the mirror means positioned between the grating and the detector means so as to image a wavelength spectrum of slit images on the detection plane of the detector means, said grating having a concave surface and an axis normal to said surface, said grating defining a zero order reference position relative to the light beam from the inlet slit and the mirror means such that the light beam impinging on the grating would be diffracted toward said mirror means in zero order, said normal axis and said light beam defining a first reference angle therebetween at said zero order reference position of the grating, said grating being angularly disposed relative to said mirror means such that said normal axis and said light beam defined a second angle therebetween, said first reference angle being greater than said second angle, and said grating and said mirror means being configured and relatively positioned so that the image plane of the slit images formed by said mirror means is substantially adapted to said detection plane at the wavelengths of said spectrum and the slit images are substantially linearly disposed along said detection plane relative to wavelength.

18. The device of claim 17 wherein said imaging mirror means provides an image plane of slit images and said grating and said imaging mirror means are configured and relatively disposed so that (a) the image plane of the spectrally dispersed images has an S-profile in a section in the direction of dispersion and perpendicular to the detector plane and being located exactly in the detector plane at three locations, and (b) the wavelength of radiation impinging upon the detector corresponds at three wavelengths to the desired wavelength resulting from an exactly linear wavelength scale and the deviation of wavelengths other than said three wavelengths defines an S-profile.

19. The device of claim 18 wherein the maximum deviations of the image plane from the detector plane are of equal magnitude on each side of said detector plane.

20. The device of claim 18 wherein the wavelengths other than said three wavelengths deviate from an exactly linear wavelength scale by positive or negative amounts and the maximum positive and negative deviations are of equal amounts.

21. The device of claim 17 wherein said grating is stationary.

* * * * *